(12) United States Patent
Ozaki et al.

(10) Patent No.: US 8,978,482 B2
(45) Date of Patent: Mar. 17, 2015

(54) PARTITION PLATE SECUREMENT FOR AN ULTRASONIC FLOW METER

(75) Inventors: Yukinori Ozaki, Nara (JP); Yuji Fujii, Nara (JP); Masato Satou, Nara (JP); Hirokazu Gotou, Nara (JP); Aoi Watanabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 92 days.

(21) Appl. No.: 13/883,506

(22) PCT Filed: Nov. 7, 2011

(86) PCT No.: PCT/JP2011/006183
§ 371 (c)(1),
(2), (4) Date: May 3, 2013

(87) PCT Pub. No.: WO2012/063448
PCT Pub. Date: May 18, 2012

(65) Prior Publication Data
US 2013/0239699 A1    Sep. 19, 2013

(30) Foreign Application Priority Data

Nov. 11, 2010 (JP) ................. 2010-252542

(51) Int. Cl.
*G01F 1/66* (2006.01)
(52) U.S. Cl.
CPC ........ *G01F 1/662* (2013.01); *G01F 1/66* (2013.01); *G01F 1/667* (2013.01)
USPC ....................................... 73/861.28
(58) Field of Classification Search
CPC ......................................... G01F 1/66
USPC ....................................... 73/861.28
See application file for complete search history.

(56) References Cited

U.S. PATENT DOCUMENTS 6,694,594 B2 *   2/2004  Chung et al. ............. 29/469.5
7,600,436 B2    10/2009  Hoecker
(Continued)

FOREIGN PATENT DOCUMENTS

DE           10057342 A1    5/2002
DE       102006023479 A1   11/2007
(Continued)

OTHER PUBLICATIONS

English Translation of Description of JP 2010/164558, Date of JP 2010/164558A: Jul. 29, 2010, Publisher: European Patent Office, pp. 1-27.*

(Continued)

*Primary Examiner* — Harshad R Patel
(74) *Attorney, Agent, or Firm* — Brinks Gilson & Lione (57) ABSTRACT

An ultrasonic flow rate measuring device includes a flow path, a partition plate that is inserted from an aperture to partition the flow path into plural sections, an ultrasound transmission body, plural ultrasonic transducers that are provided in positions facing a bottom plate such that an ultrasonic wave transmitted from one of the ultrasonic transducers through the ultrasound transmission body is reflected by the bottom plate and received by the other ultrasonic transducer, a measurement circuit that measures an ultrasonic propagation time between the plurality of the ultrasonic transducers; and a calculation circuit that obtains a flow rate of the target fluid based on a signal from the measurement circuit.

5 Claims, 10 Drawing Sheets

(56) References Cited

U.S. PATENT DOCUMENTS

| | | |
|---|---|---|
| 7,603,914 B2 | 10/2009 | Hoecker |
| 7,878,073 B2 | 2/2011 | Hoecker |
| 7,882,751 B2 | 2/2011 | Hoecker |
| 7,926,361 B2 | 4/2011 | Hoecker |
| 7,946,186 B2 | 5/2011 | Hoecker |
| 8,079,271 B2 | 12/2011 | Hoecker |
| 2008/0072686 A1 | 3/2008 | Hoecker |
| 2008/0072688 A1 | 3/2008 | Hoecker |
| 2009/0217771 A1 | 9/2009 | Hoecker |
| 2010/0011878 A1 | 1/2010 | Hoecker |
| 2010/0011879 A1 | 1/2010 | Hoecker |
| 2010/0037704 A1 | 2/2010 | Hoecker |
| 2010/0043566 A1 | 2/2010 | Hoecker |
| 2011/0238333 A1 | 9/2011 | Miyata et al. |

FOREIGN PATENT DOCUMENTS

| | | |
|---|---|---|
| EP | 0 273 385 A2 | 7/1988 |
| JP | 2008-107234 A | 5/2008 |
| JP | 2008-232943 A | 10/2008 |
| JP | 2009-210525 A | 9/2009 |
| JP | 2010-164558 A | 7/2010 |
| WO | WO 2007/134982 A1 | 11/2007 |

OTHER PUBLICATIONS

International Search Report for International Application No. PCT/JP2011/006183, dated Nov. 29, 2011, 2 pages.

Supplementary European Search Report in corresponding European Application No. 11 83 9875, dated Sep. 23, 2013, 6 pages.

* cited by examiner

PRIOR ART

PRIOR ART

PARTITION PLATE SECUREMENT FOR AN ULTRASONIC FLOW METER

This application is a 371 application of PCT/JP2011/006183 having an international filing date of Nov. 7, 2011, which claims priority to JP2010-252542 filed Nov. 11, 2010, the entire contents of which are incorporated herein by reference.

TECHNICAL FIELD

The present invention relates to an ultrasonic flow rate measuring device.

BACKGROUND ART

In a conventional ultrasonic flow rate measuring device, plural partition plates that partition a flow path are latched in slits provided in both side plates of the flow path in order to construct a multilayer flow path. Plural flat flow paths are formed (for example, see PTL 1).

Figure 10:
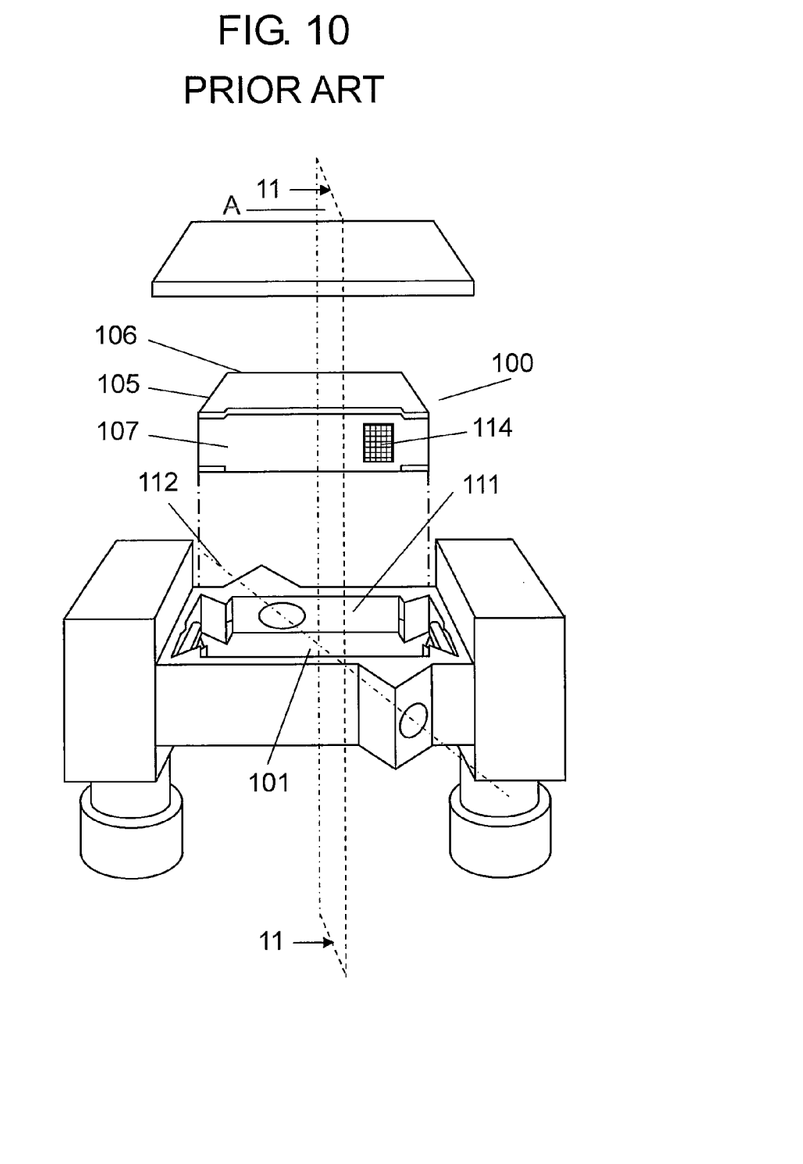
FIG. 10 is an overall perspective view of a conventional ultrasonic flow rate measuring device.
Figure 11:
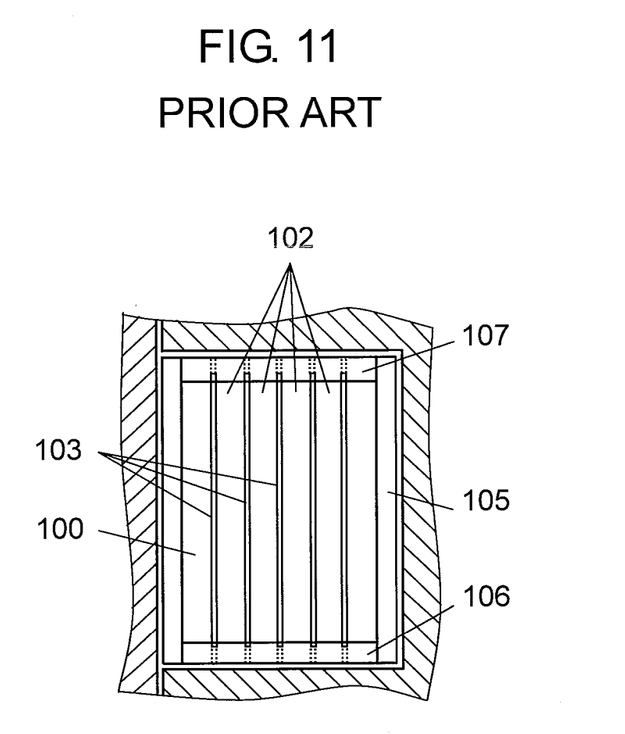
FIG. 11 is a sectional view in a direction 11-11 when the conventional ultrasonic flow rate measuring device in FIG. 10 is cut by a plane A.
Figure 12:
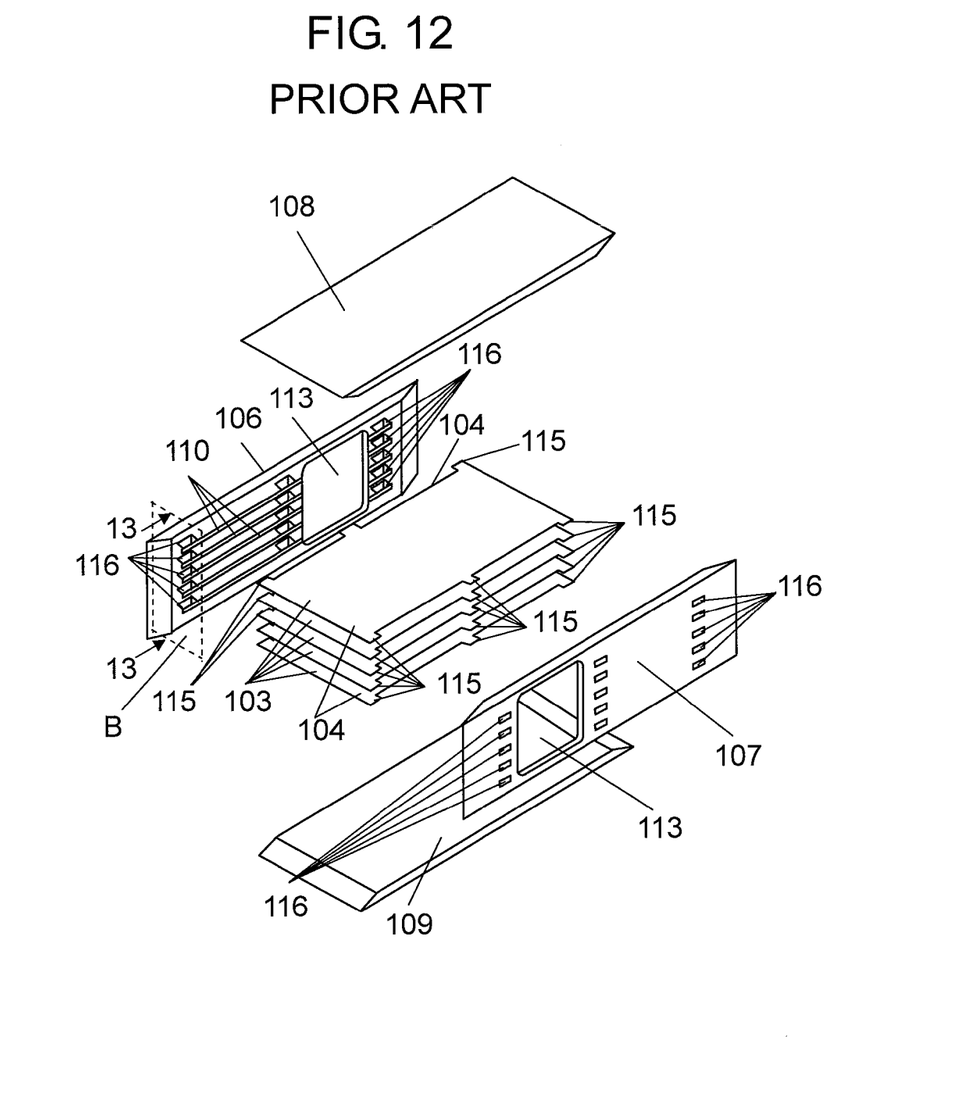
FIG. 12 is an exploded perspective view illustrating a multilayer flow path member of the conventional ultrasonic flow rate measuring device.
Figure 13:
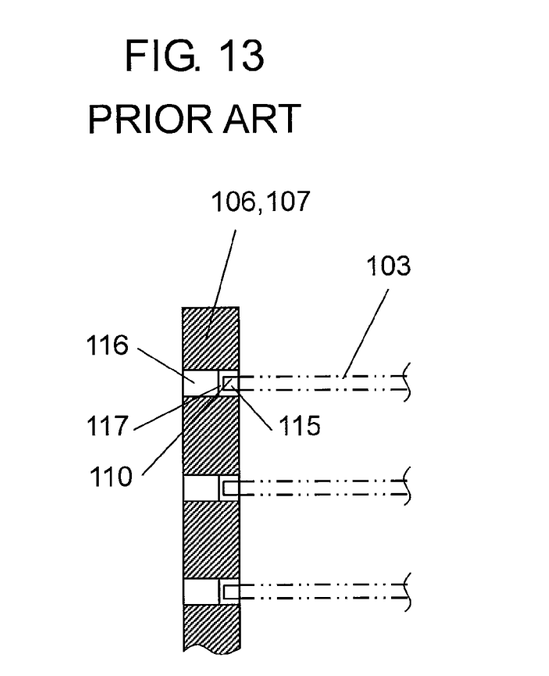
FIG. 13 is a sectional view in a direction 13-13 when a side plate in FIG. 12 is cut by a plane B.

FIG. 10 is an overall perspective view of a conventional ultrasonic flow rate measuring device described in PTL 1, FIG. 11 is a sectional view in a direction 11-11 when the ultrasonic flow rate measuring device in FIG. 10 is cut by a plane A, FIG. 12 is an exploded perspective view of a multilayer flow path member of the ultrasonic flow rate measuring device, and FIG. 13 is a sectional view in a direction 13-13 when a side plate in FIG. 12 is cut by a plane B. As illustrated in FIGS. 10 to 13, a multilayer flow path member 100 includes partition plates 103 that partition measurement flow path 101 into plural flat flow paths 102 and frame 105 that supports edge portions 104 along fluid flowing direction in partition plates 103. That is, frame 105 is formed into a rectangular box shape by side plates 106 and 107, top plate 108, and bottom plate 109. Partition plates 103 are horizontally retained between side plates 106 and 107 at predetermined intervals in a vertical direction.

Plural slits 110 are provided in an inner surface of each of side plates 106 and 107 in order to retain partition plates 103 at predetermined intervals. Slits 110 are provided at equal intervals in a direction orthogonal to a fluid flow such that sectional areas of flat flow paths 102 are equalized.

While multilayer flow path member 100 is fitted in multilayer member attaching portion 111 of measurement flow path 101, ultrasonic wave passing apertures 113 are provided in side plates 106 and 107 of frame 105 of multilayer flow path member 100 located in ultrasonic propagation path 112. Filter member 114 is attached to aperture 113. Plural flanges 115 are provided in edge portion 104 of partition plate 103.

In slits 110 provided in side plates 106 and 107 of frame 105, through-hole 116 is made at a position corresponding to flange 115 of partition plate 103. An end face of partition plate 103 is exposed through through-hole 116. Because through-hole 116 is made every flange 115, flange 115 is bonded and fixed to frame 105 using bonding agent 117.

In assembling multilayer flow path member 100, after flange 115 is inserted in through-hole 116, side plates 106 and 107 and partition plate 103 are bonded and fixed to each other using bonding agent 117. Therefore, the number of components increases and it takes a long time to assemble multilayer flow path member 100, which results in a problem of a cost increase. Bonding agent 117 overflows onto a side of flat flow path 102 to generate a disturbance of a flow in flat flow path 102, which possibly degrades accuracy of flow rate measurement. Thus, from the viewpoint of the assembly of partition plate 103 and the measurement accuracy, there is room for improvement in the conventional ultrasonic flow rate measuring device.

PTL 1: Unexamined Japanese Patent Publication No. 2009-210525

SUMMARY OF THE INVENTION

In accordance with an aspect of the present invention, an ultrasonic flow rate measuring device includes: a flow path in which a target fluid flows, the flow path including a first sidewall that is provided along a flow direction of a target fluid, a second sidewall that is disposed facing the first sidewall, a bottom plate that extends from a bottom of the first sidewall to a bottom of the second sidewall, an upper wall unit that connects an upper portion of the first sidewall and an upper portion of the second sidewall, and an aperture that is provided in the upper wall unit facing the bottom plate; a partition plate that is inserted from the aperture to partition the flow path into a plurality of sections; an ultrasound transmission body that covers the aperture; a plurality of ultrasonic transducers that are provided in positions facing the bottom plate such that an ultrasonic wave transmitted from one of the ultrasonic transducers through the ultrasound transmission body is reflected by the bottom plate and received by the other ultrasonic transducer; a measurement circuit that measures an ultrasonic propagation time between the ultrasonic transducers; and a calculation circuit that obtains a flow rate of the target fluid based on a signal from the measurement circuit.

In the ultrasonic flow rate measuring device having the above configuration, when the flow path is partitioned into plural sections, it is only necessary to insert the partition plate from the aperture, and it takes hardly any time for assembly. Any protrusions do not exist on insides of the plural flow paths, but the flow rate can be measured with high accuracy.

DETAILED DESCRIPTION OF THE PREFERRED EMBODIMENT

Hereinafter, an embodiment of the present invention will be described with reference to the drawings. However, the present invention is not limited to the embodiment.

Exemplary Embodiment

Figure 1:
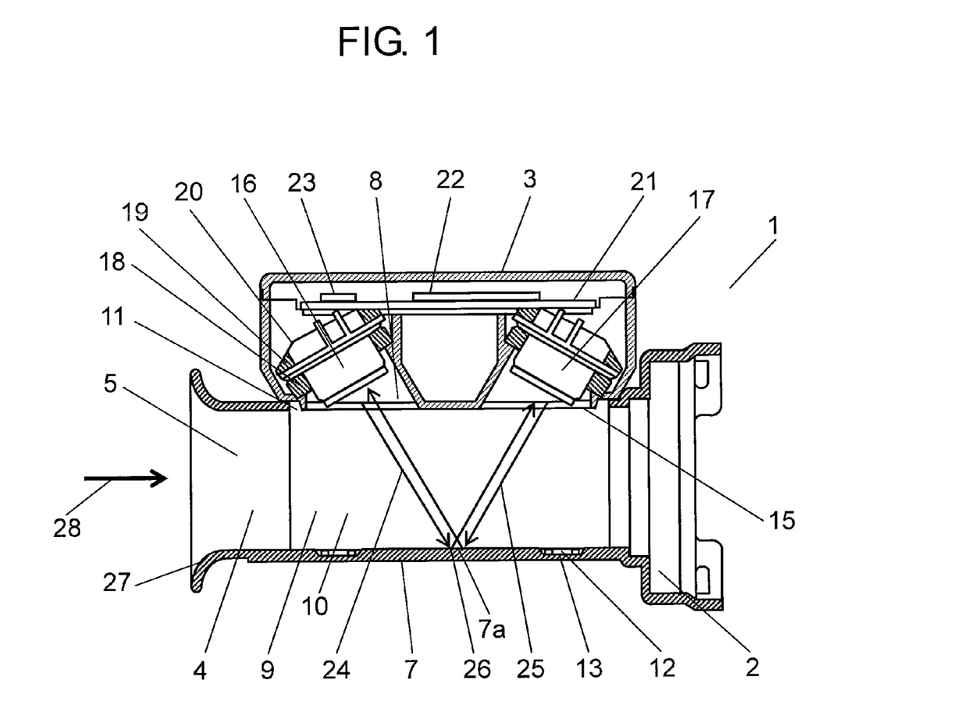
FIG. 1 is a sectional view illustrating a configuration of an ultrasonic flow rate measuring device according to an embodiment of the present invention.
Figure 2:
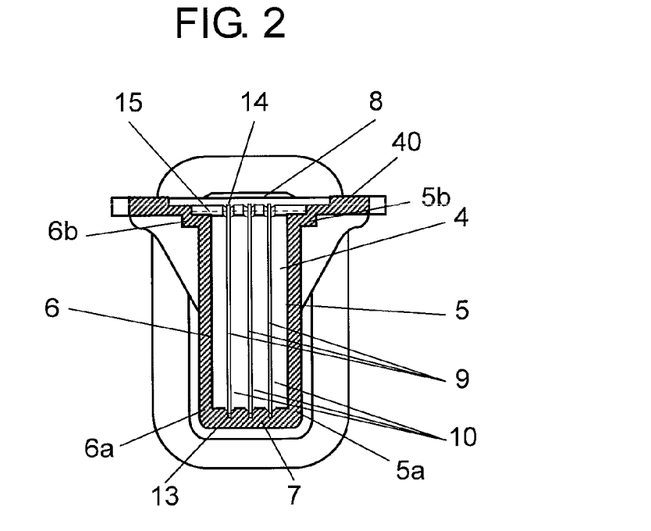
FIG. 2 is a side view illustrating a flow path block of the ultrasonic flow rate measuring device of the embodiment.
Figure 3:
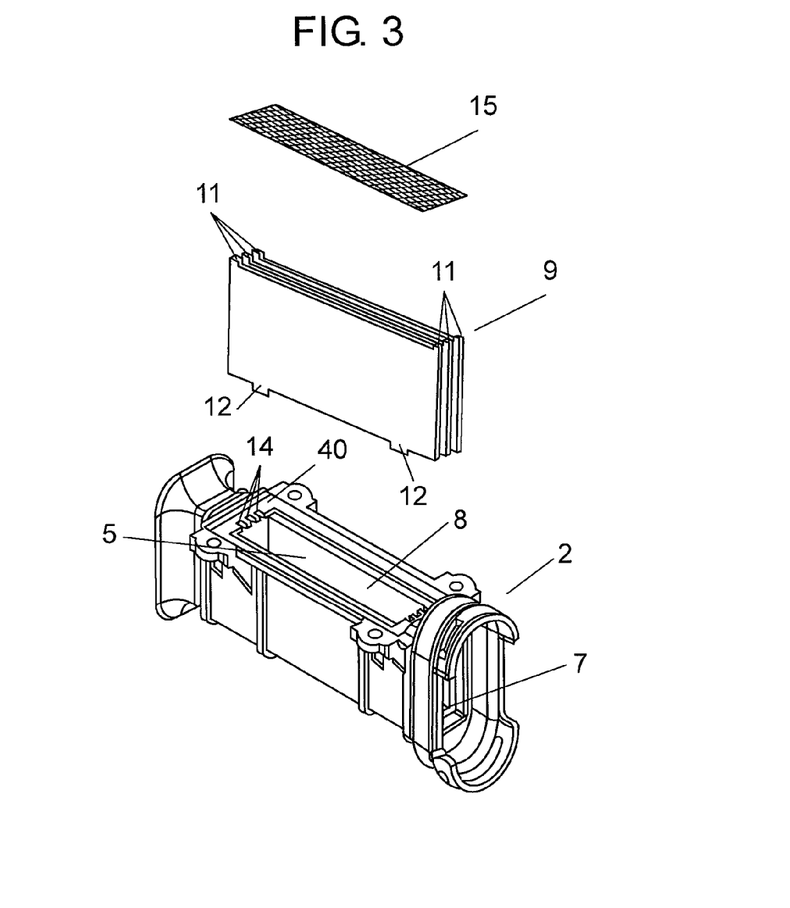
FIG. 3 is an exploded perspective view illustrating the flow path block of the ultrasonic flow rate measuring device of the embodiment.

FIG. 1 is a sectional view illustrating a configuration of an ultrasonic flow rate measuring device according to an embodiment of the present invention, FIG. 2 is a side view illustrating a flow path block of the ultrasonic flow rate measuring device of the embodiment, and FIG. 3 is an exploded perspective view illustrating the flow path block of the ultrasonic flow rate measuring device of the embodiment.

As illustrated in FIGS. 1 to 3, ultrasonic flow rate measuring device 1 includes flow path block 2 and sensor block 3. Rectangular flow path 4 is formed by first sidewall 5 that is provided along arrow 28 indicating a flow direction of a target fluid, second sidewall 6 that is disposed facing first sidewall 5, bottom plate 7, upper wall unit 40, and aperture 8. The target fluid of flow path block 2 flows in flow path 4. Bottom plate 7 extends from bottom of first sidewall 5a to bottom of second sidewall 6a. Upper wall unit 40 connects upper portion of first sidewall 5b and upper portion of second sidewall 6b. Aperture 8 is provided in upper wall unit 40 to face bottom plate 7.

Plural partition plates 9 that are of partition means are inserted from aperture 8 in flow path 4 to partition flow path 4 into plural sections. Flow path 4 is constructed by plural flat flow paths 10. Upper protrusions 11 are formed at both side ends in an upper portion of partition plate 9, and lower protrusions 12 are formed in plural position at a lower end of partition plate 9. Lower protrusion 12 and upper protrusion 11 are inserted in insertion groove 13 provided in bottom plate 7 and insertion groove 14 provided in upper wall unit 40, respectively. As a result, when flow path 4 is constructed by plural flat flow paths 10, partition plate 9 inserted from aperture 8 is supported by insertion grooves 13 and 14, whereby a correct flow path dimension is obtained to correctly measure a flow of the target fluid.

Ultrasound transmission body 15 covering aperture 8 is provided in an upper surface of aperture 8. For example, a metallic mesh, a resin mesh, and a foam resin are used as ultrasound transmission body 15. In an upper portion of ultrasonic flow rate measuring device 1, sensor block 3 and flow path block 2 are integrated with ultrasound transmission body 15 interposed therebetween.

First ultrasound transducer 16 and second ultrasound transducer 17 are fixed to sensor block 3 with a given angle. Plural ultrasonic transducers are provided in positions facing bottom plate 7. An ultrasonic wave, which is transmitted from first ultrasound transducer 16 that is one of the ultrasonic transducers through ultrasound transmission body 15, is reflected by bottom plate 7 and received by second ultrasound transducer 17 that is the other ultrasonic transducer. As to a method for fixing first ultrasound transducer 16, first ultrasound transducer 16 is sandwiched between packing 18 and packing 19, and fixed component 20 is used. Packings 18 and 19 play a role in sealing the target fluid and a role in not solid-propagating vibrations of first ultrasound transducer 16 and second ultrasound transducer 17 to sensor block 3.

Board 21 is provided above first ultrasound transducer 16 and second ultrasound transducer 17. Measurement circuit 22 that measures an ultrasonic propagation time between first ultrasound transducer 16 and second ultrasound transducer 17 and calculation circuit 23 that obtains a flow rate of the target fluid based on a signal from measurement circuit 22 are provided in board 21. Thus, measurement circuit 22 measures the ultrasonic propagation time between the plural ultrasonic transducers.

Insertion groove 13 is provided in a position different from reflection position 7a where almost ultrasonic waves are reflected by bottom plate 7. Therefore, the ultrasonic wave transmitted from first ultrasound transducer 16 is reflected by bottom plate 7 having a flat surface, and received by second ultrasound transducer 17. Because ultrasonic reflection position 7a does not include any irregularity portions such as insertion groove 13, ultrasonic reflection position 7a has good ultrasonic reception sensitivity, which allows the stable measurement.

The ultrasonic wave transmitted from first ultrasound transducer 16 is reflected by reflecting surface 26 of bottom plate 7 as indicated by arrow 24, and received by second ultrasound transducer 17. Entrance wall surface 27 of flow path 4 into which the target fluid flows is constructed by a curved surface. A smooth flow is obtained because entrance wall surface 27 does not include any corner portions when the target fluid flows into flow path 4. Accordingly, because straightened target fluid flows into flow path 4, the measurement accuracy is enhanced and a pressure loss is decreased.

Figure 4A:
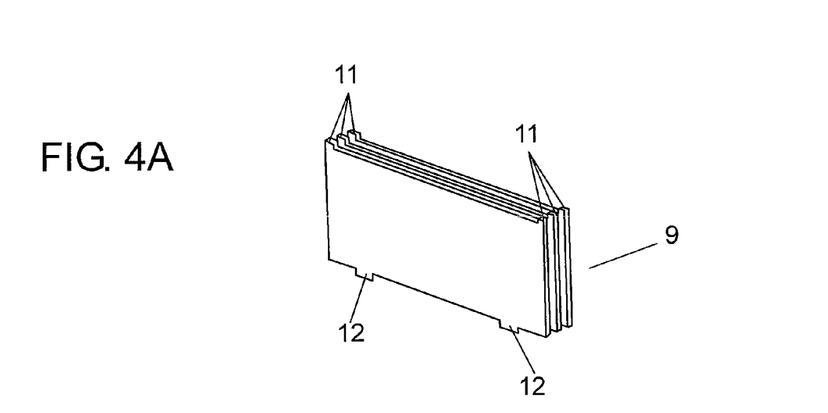
FIG. 4A is a perspective view illustrating a partition plate of the ultrasonic flow rate measuring device of the embodiment.
Figure 4B:
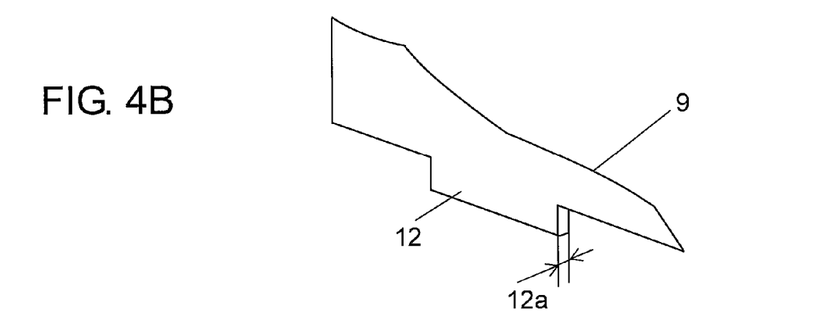
FIG. 4B is a perspective view illustrating a protrusion unit of the partition plate of the ultrasonic flow rate measuring device of the embodiment.
Figure 5A:
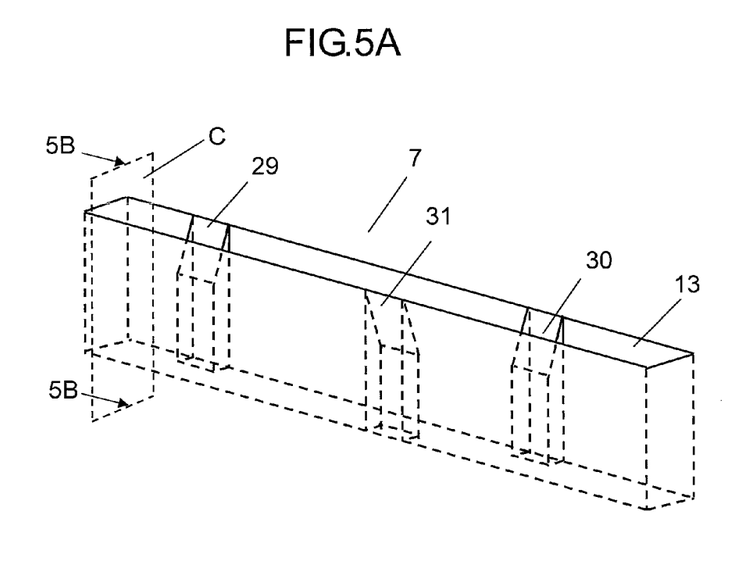
FIG. 5A is a perspective view illustrating an insertion groove of the ultrasonic flow rate measuring device of the embodiment.
Figure 5B:
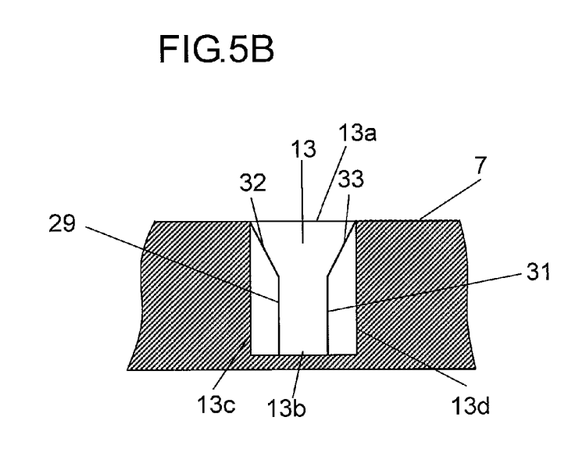
FIG. 5B is a sectional view in a direction 5B-5B when a bottom plate in FIG. 5A is cut by a plane C.

A method for inserting lower protrusion 12 of partition plate 9 in insertion groove 13 of bottom plate 7 will be described below. FIG. 4A is a perspective view illustrating the partition plate of the ultrasonic flow rate measuring device of the embodiment, FIG. 4B is a perspective view illustrating the protrusion unit of the partition plate of the ultrasonic flow rate measuring device, FIG. 5A is a perspective view illustrating the insertion groove of the ultrasonic flow rate measuring device, and FIG. 5B is a sectional view in a direction 5B-5B when the bottom plate in FIG. 5A is cut by a plane C.

As illustrated in FIGS. 4A to 5B, in inner surfaces 13c and 13d of insertion groove 13 of bottom plate 7, three protruded abutment units 29, 30, and 31 are provided in a zigzag manner so as not to face one another. Lower protrusions 12 of partition plate 9 and abutment units 29, 30, and 31 are abutted on each other to nip partition plate 9.

A vertical section of insertion groove 13 has a shape that extends toward an entrance direction by slope surfaces 32 and 33. That is, upper portion of insertion groove 13a is greater than width of lower protrusion 12a, and lower portion of insertion groove 13b is less than width of lower protrusion 12a. Because upper portion of insertion groove 13a is greater than width of lower protrusion 12a, lower protrusion 12 is easily inserted in insertion groove 13. Because lower portion of insertion groove 13b is less than width of lower protrusion 12a, lower protrusion 12 is retained by insertion groove 13 with no gap. As a result, partition plate 9 is easily assembled in and fixed to a position in flow path 4. At this point, lower portion of insertion groove 13b has a dimension corresponding to a gap between abutment units 29, 30, and 31, and is less than a plate thickness of partition plate 9.

Figure 6:
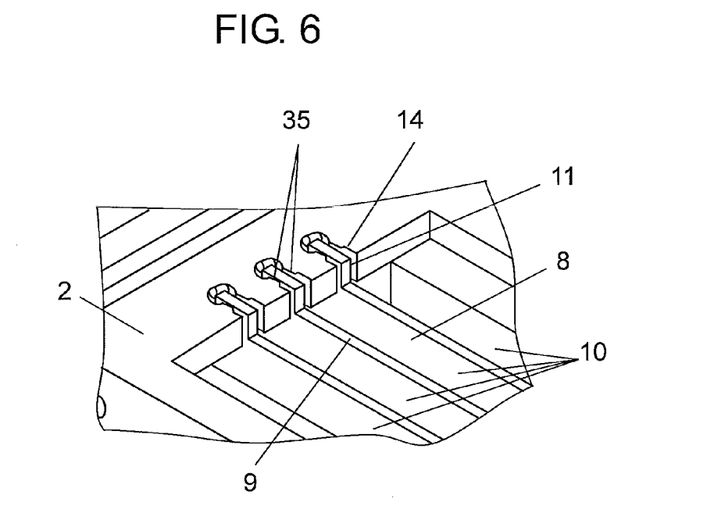
FIG. 6 is an assembly perspective view illustrating the partition plate of the ultrasonic flow rate measuring device according to the embodiment of the present invention.

An assembly procedure will be described below. FIG. 6 is an assembly perspective view illustrating the partition plate of the ultrasonic flow rate measuring device of the embodiment, and FIG. 7 is an assembly plan view illustrating the partition plate of the ultrasonic flow rate measuring device.

As illustrated in FIG. 6, insertion groove 14 includes slope surface 35 that extends in the upward direction in which partition plate 9 is inserted. Because insertion groove 14 is wider than partition plate 9 thanks to slope surface 35, partition plate 9 is easily inserted in insertion groove 14. When partition plate 9 is inserted in insertion groove 14, lower protrusion 12 of partition plate 9 is inserted in insertion groove 13 provided in bottom plate 7. At this point, partition plate 9 is inserted in lower portion of insertion groove 13b along slope surfaces 32 and 33 having a dimension greater than the plate thickness of partition plate 9. Because lower portion of insertion groove 13b is less than the plate thickness of partition plate 9, there is no gap between partition plate 9 and insertion groove 13 when partition plate 9 is inserted in insertion groove 13.

Thus, partition plate 9 is easily inserted in flow path block 2 by slope surfaces 32, 33, and 35 to improve workability. After partition plate 9 is inserted in insertion grooves 13 and 14, partition plate 9 is fixed by abutment units 29, 30, and 31. Therefore, partition plate 9 is not moved, and partition plate 9 is not vibrated by the flow of the target fluid, which allows the flow rate to be measured with high accuracy.

Figure 7:
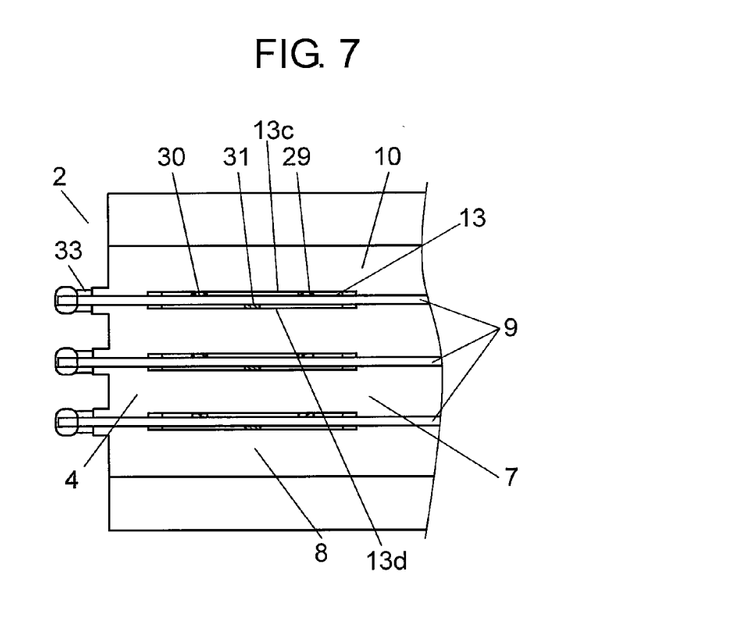
FIG. 7 is an assembly plan view illustrating the partition plate of the ultrasonic flow rate measuring device of the embodiment.

As illustrated in FIG. 7, four flat flow paths 10 are formed in flow path 4 by three partition plates 9. Because inserted partition plate 9 is fixed and nipped by insertion groove 13, partition plate 9 does not fall from flow path block 2 even if aperture 8 is inclined downward. Ultrasound transmission body 15 is placed on the upper surface of partition plate 9. Ultrasound transmission body 15 does not fall because sensor block 3 and flow path block 2 are integrated.

Figure 8:
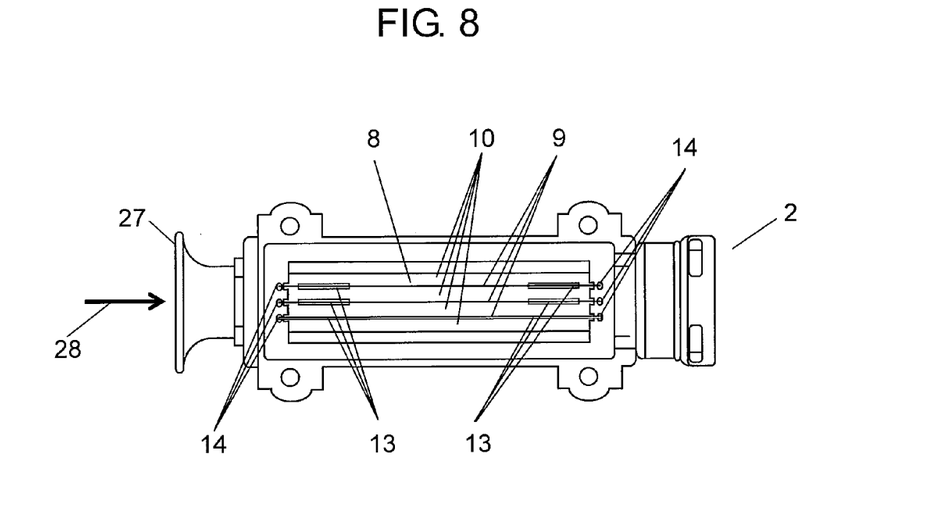
FIG. 8 is a plan view illustrating the flow path block of the ultrasonic flow rate measuring device of the embodiment.

An operation and action of the ultrasonic flow rate measuring device having the above configuration will be described below. FIG. 8 is a plan view illustrating the flow path block of the ultrasonic flow rate measuring device of the embodiment, and FIG. 9 is a plan view when the ultrasound transmission body is disposed in the flow path block of the ultrasonic flow rate measuring device.

Figure 9:
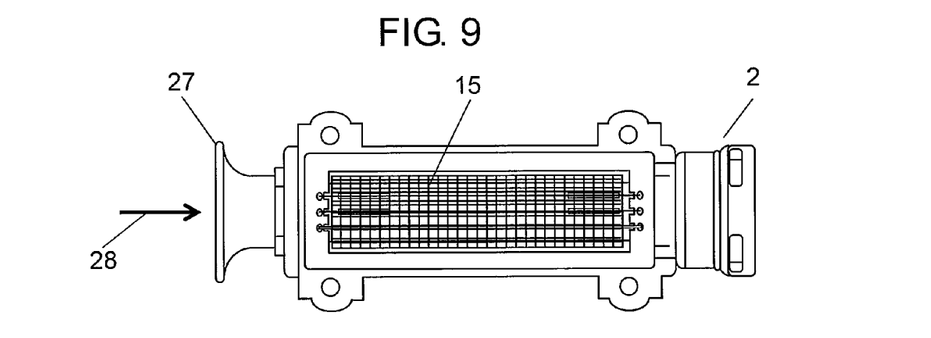
FIG. 9 is a plan view when an ultrasound transmission body is disposed in the flow path block of the ultrasonic flow rate measuring device of the embodiment.

As illustrated in FIGS. 8 and 9, the target fluid flowing along arrow 28 is straightened by entrance wall surface 27 constructed by the curved surface, and introduced to flat flow path 10. The introduced target fluid flows plural flat flow paths 10 with an equal distribution ratio.

At this point, as illustrated in FIG. 1, the ultrasonic wave transmitted from first ultrasound transducer 16 passes through ultrasound transmission body 15, obliquely crosses flat flow path 10, is reflected by reflecting surface 26 of bottom plate 7, and is received by second ultrasound transducer 17 (arrow 24). Similarly, the ultrasonic wave transmitted from second ultrasound transducer 17 as indicated by arrow 25 is reflected by reflecting surface 26 and received by first ultrasound transducer 16.

In order to measure the flow rate, measurement circuit 22 measures ultrasonic arrival times when the ultrasonic wave is transmitted from first ultrasound transducer 16 to second ultrasound transducer 17 and when the ultrasonic wave is transmitted from second ultrasound transducer 17 to first ultrasound transducer 16. Calculation circuit 23 obtains a flow speed, and obtains the flow rate from the flow speed.

As described above, in order to form flat flow path 10, it is only necessary to insert partition plate 9 in insertion groove 14 and insertion groove 13. Therefore, flat flow path 10 is assembled in a short time.

Because insertion groove 13 provided in bottom plate 7 is provided distant from ultrasonic reflection position 7a, the ultrasonic waves transmitted from first ultrasound transducer 16 and second ultrasound transducer 17 are efficiently reflected. As a result, reception sensitivity of first ultrasound transducer 16 and second ultrasound transducer 17 can be enhanced to perform the stable measurement.

INDUSTRIAL APPLICABILITY

As described above, the ultrasonic flow rate measuring device of the present invention is useful as a fluid flow rate measuring device and the like.

The invention claimed is:

1. An ultrasonic flow rate measuring device comprising:
   a flow path in which a target fluid flows, the flow path including a first sidewall that is provided along a flow direction of the target fluid, a second sidewall that is disposed facing the first sidewall, a bottom plate that extends from a bottom of the first sidewall to a bottom of the second sidewall, an upper wall unit that connects an upper portion of the first sidewall and an upper portion of the second sidewall, and one aperture that is provided in the upper wall unit facing the bottom plate;
   a partition plate that is inserted from the aperture to partition the flow path into a plurality of sections;
   an ultrasound transmission body that covers the aperture;
   a plurality of ultrasonic transducers that are provided in positions facing the bottom plate such that an ultrasonic wave transmitted from one of the ultrasonic transducers through the ultrasound transmission body is reflected by the bottom plate and received by the other ultrasonic transducer;
   a measurement circuit that measures an ultrasonic propagation time between the plurality of the ultrasonic transducers; and
   a calculation circuit that obtains a flow rate of the target fluid based on a signal from the measurement circuit,
   wherein the partition plate includes upper protrusions formed only at both side ends in an upper portion of the partition plate, and lower protrusions formed in plural positions at a lower end of the partition plate,
   first insertion grooves, in which the upper protrusions are inserted, are provided at the both sides of the aperture in the flow path direction, and
   second insertion grooves, in which the lower protrusions are inserted, are provided in the bottom plate.

2. The ultrasonic flow rate measuring device according to claim 1, wherein each of the insertion grooves of the bottom plate is provided in a position different from a reflection position of the ultrasonic wave in the bottom plate.

3. The ultrasonic flow rate measuring device according to claim 1, wherein an upper portion of the insertion groove of the bottom plate is greater than a width of the protrusion and a lower portion of the insertion groove is less than the width of the protrusion.

4. The ultrasonic flow rate measuring device according to claim 1 comprising a plurality of abutment units that protrude from inner surfaces of the insertion groove of the bottom plate, the abutment units being located so as not to face each other, wherein the partition plate is abutted on and held by the abutment units.

5. The ultrasonic flow rate measuring device according to claim 1, wherein an entrance wall surface of the flow path in which the target fluid flows is a curved surface.

\* \* \* \* \*